UNITED STATES PATENT OFFICE.

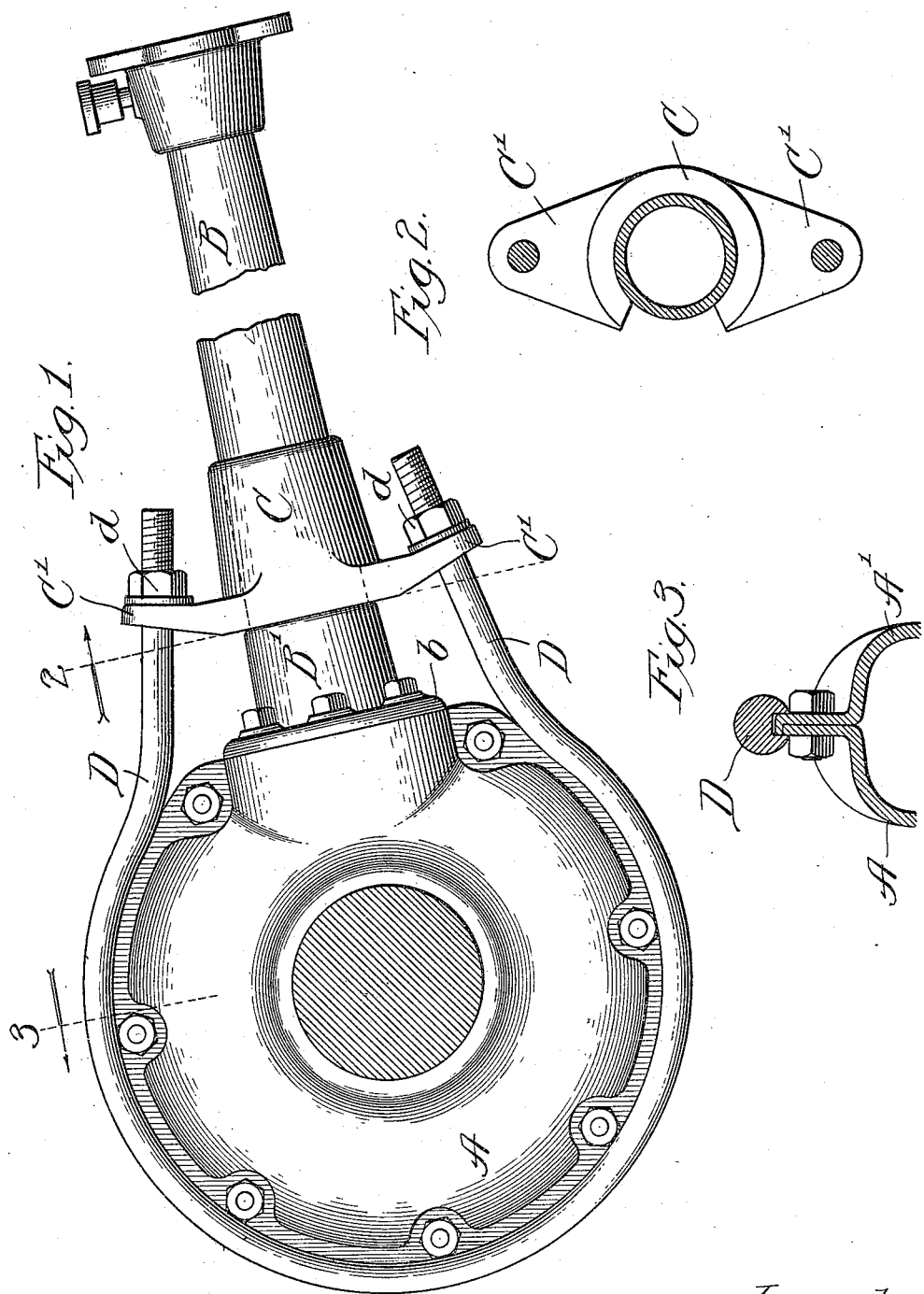

DELAMERE B. GARDNER, OF CHICAGO, ILLINOIS.

REINFORCING-TRUSS FOR MOTOR-CARS.

961,406.  Specification of Letters Patent.  Patented June 14, 1910.

Application filed December 6, 1909. Serial No. 531,652.

*To all whom it may concern:*

Be it known that I, DELAMERE B. GARDNER, a citizen of the United States, residing at Chicago, in the county of Cook and State of Illinois, have invented a new and useful Reinforcing - Truss for Motor - Cars, of which the following is a specification.

My invention relates to certain new and useful improvements in reinforcing trusses for the rear axle of motor cars, and is fully described and explained in the specification and shown in the accompanying drawings, in which:

Figure 1 is a side elevation showing my improved device in position with the vehicle axle in section; Fig. 2 is a section in the line 2 of Fig. 1 and Fig. 3 is a section in the line 3 of Fig. 1.

Referring to the drawing A and $A^1$ are the halves of the casing for the differential-gear of the motor car, the same having integral side extensions through which the two halves of the rear axle run.

B is the tubular bearing for the shaft running rearwardly from the engine to the rear axle, the same being, in the type of car to which my truss is more particularly designed to be applied, of a tapering or conical form as illustrated. The tubular bearing B terminates at its rear end in a collar $B^1$ having an outwardly turned flange $b$ which is adapted to be bolted to the two halves of the differential-casing A and $A^1$ in the manner illustrated. The part of the construction thus far described is old and common and is in fact illustrated in detail in accordance with the form now adopted by one of the motor cars most largely sold upon the market. The particular car in question, of which many thousands are now in use, was manufactured with the connection between the collar $B^1$ and the halves of the differential-casing altogether too light to be able to withstand the strains of ordinary use, and as a result the owners and users of these many thousands of cars are subjected to constant repair bills in replacing the halves of the differential-casing and also the tubular-bearing B. My reinforcing truss is especially designed to be applied to these thousands of cars which are now in use, so as to remedy the defects inherent in their construction, making the car perfectly efficient and producing certain advantageous features, which will hereinafter appear. There are many cars in which the application of such a device is not at all necessary, and yet it will appear in the course of the description of my present device that it could positively be applied to many cars which are made strong enough not to require its application as a matter of absolute necessity.

C is a boss internally tapered to conform to the taper of the tubular-bearing B and opened at one side so that it can be slipped over said tubular bearing at the forward or smaller end thereof and be moved backward so as to come to rest against the collar $B^1$ and at that point snugly fit the exterior surface of the tubular-bearing B. The boss is provided with integral upwardly and downwardly extended ears $C^1$, which said ears are perforated for the passage of a truss-rod D threaded at its ends and provided with nuts $d$ engaging said ears $C^1$. The truss-rod is grooved on its inner side to pass over the flanges of the two halves of the differential-casing outside of the bolts which unite said halves, and is so disposed as to contact with the heads of said bolts and the nuts thereon in the manner illustrated.

It will be evident from the foregoing description of the construction that my improved reinforcing truss can be placed in position upon the car without any disassembling of any parts of the car, by the simple process of slipping the boss into position, placing the truss-rod above the differential-casing and tightening up the nuts $d$. The device produces several different and highly advantageous results. In the first place it holds the differential-casing and the tubular-bearing B tightly together, greatly reinforcing the weak attachment between the end of said tubular-bearing in the halves of the differential-casing. In the second place it causes the strains between the tubular-bearing and the differential-casing, which normally tend to separate said parts, to be transmitted to a point well forward of the point of connection between said parts, so that the breaking leverage is greatly decreased. Further the truss-rod holds the halves of the differential-casing tightly together, while overlapping the flanges thereof, thereby strengthening the construction and it also closes the joints between said halves preventing the escape of grease.

Still further the truss-rod is so constructed, as above mentioned, that it contacts with the nuts and bolts which join the halves of the differential-casing, thereby acting as a nut-lock. For the foregoing reasons the construction is very desirable. It will be seen that it is evidently of a cheap construction, and that its parts are simple and few in number, so that it will not be likely to get out of order.

I realize that considerable variation is possible in the details of construction of my improved device, without departing from the spirit of my invention, and I do not intend therefore, to limit myself to the specific form herein shown and described.

What I claim as new and desire to secure by Letters Patent is:—

1. The combination in an automobile of a differential-casing and a forwardly extending shaft-bearing, with a separately-formed truss member surrounding the differential-casing and extending forwardly and secured to said shaft-bearing.

2. The combination with the two halves of a differential-casing meeting in flanges, and a forwardly projecting shaft-bearing, of a grooved truss-rod surrounding said differential-casing and embracing the flanges on the halves thereof and secured at its end to the shaft-bearing.

3. The combination with two halves of a differential-casing meeting in flanges bolted together, of a grooved truss-rod surrounding the differential-casing, embracing the flanges thereon, and contacting with the nuts, the ends of the truss-rod being secured to the forwardly extending shaft-bearing.

4. The combination with a differential-casing and a forwardly projecting shaft-bearing, of an anchor member mounted upon the shaft-bearing and provided with ears, and a truss-rod, having its ends extending through said ears and surrounding the differential-casing.

5. The combination with a differential-casing and a forwardly extending tapered shaft-bearing, of an anchor member in the form of a boss open on one side and mounted upon the shaft-bearing, the opening being of sufficient size to pass over the smaller portions of the shaft-bearing, said anchor member being provided with ears, and a truss-rod surrounding the differential-casing and passing through said ears.

6. The combination with a differential-casing made of two flanged halves secured together, and a tapered-tubular shaft-bearing extending forwardly therefrom, of an anchor member having a boss opened on one side to be slipped over the reduced portion of the tubular shaft-bearing and provided with ears, and a grooved truss-rod having its ends passed through the ears of said anchor member, the body of the truss-rod being passed about the differential casing with its groove embracing the flanges thereon.

DELAMERE B. GARDNER.

In presence of—
CHAS. E. GAYLORD,
R. A. SCHAEFER.